United States Patent [19]

Lee

[11] Patent Number: 5,167,154
[45] Date of Patent: Dec. 1, 1992

[54] POINT LEVEL DETECTOR

[75] Inventor: Ron C. Lee, Bloomsbury, N.J.

[73] Assignee: The BOC Group, Inc., New Providence, N.J.

[21] Appl. No.: 790,740

[22] Filed: Nov. 8, 1991

[51] Int. Cl.$^5$ .............................................. G01F 23/22
[52] U.S. Cl. ..................................... 73/295; 73/304 R
[58] Field of Search ........................... 73/295; 374/165

[56] References Cited

U.S. PATENT DOCUMENTS

| | | | |
|---|---|---|---|
| 3,097,496 | 7/1963 | Petts et al. | 73/295 X |
| 3,363,466 | 1/1968 | Guidi | 73/295 |
| 3,461,446 | 8/1969 | Sergeant | 73/295 X |
| 4,358,955 | 11/1982 | Rait | 73/292 X |
| 4,560,973 | 12/1985 | Grimm et al. | 374/165 X |
| 4,929,930 | 5/1990 | Rezabek | 73/295 X |

Primary Examiner—Daniel M. Yasich
Attorney, Agent, or Firm—David M. Rosenblum; Larry R. Cassett

[57] ABSTRACT

The present invention provides a level detector to sense whether the level of a liquid having a nonambient temperature such as a cryogenic liquid has reached a predetermined point. A stainless steel type T thermocouple probe is provided for generating a temperature signal referrable to absolute temperature. A high thermal conductivity the type T thermocouple probe is adapted to be mounted so that it submerges in the liquid when the level of the liquid has reached the predetermined point tube is, at one end, in good thermal contact with a thermocouple contained within distal end of the thermocouple probe and, at the other end, is exposed to ambient conditions. The high thermal conductivity tube acts to conduct heat between the ambient and the thermocouple. A thermally insulating tube encapsulates the copper tube between its ends so that heat is not dissipated along its length and the temperature signal will be function of a sum of the nonambient temperature of the liquid and a constant divided by a convective heat transfer, which will increase in the liquid. As a result, the temperature signal will change upon submergence of the thermocouple within the liquid to indicate that the liquid has reached the point level detector.

5 Claims, 1 Drawing Sheet

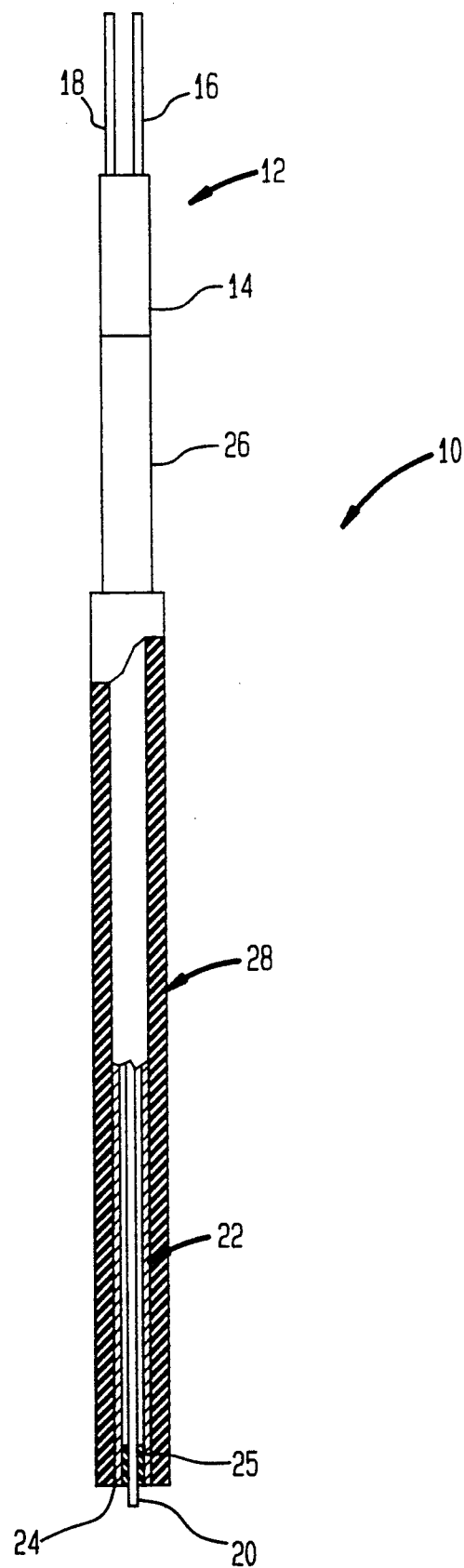

POINT LEVEL DETECTOR

BACKGROUND OF THE PRIOR ART

The present invention relates to a point level detector to sense the level of a liquid. More particularly, the present invention relates to a point level detector adapted to sense the level of a liquid having a temperature above or below ambient temperature by sensing the increased heat transfer coefficient of the liquid.

The prior art has provided point level detectors for sensing a liquid level of a cryogenic liquid, such as liquid nitrogen, contained within a container. Point level detectors are so called because they serve to indicate whether liquid is above or below a predetermined level in a container. This is to be contrasted with continuous level detectors that measure the level of a liquid within the container.

Point level detectors of the prior art that are specifically designed to sense cryogenic liquid level often employ self heating temperature sensing elements. Such self heated temperature sensing elements generate a temperature signal related to absolute temperature. When the level of the liquid falls below the temperature sensor, the temperature sensing element self heats because the gaseous form of the cryogen conducts heat at lower rate than the liquid form of the cryogen. Such self heating of the sensing element is accompanied by an increase in temperature and a consequent change in the temperature signal to indicate the drop in the liquid level. An example of such a point level detector can be found in U.S. Pat. No. 3,755,801 which employs silicon diodes as the self heating temperature sensing elements.

There are point level detectors, such as disclosed in U.S. Pat. No. 3,938,347, that utilize temperature sensing elements, formed by thermocouple junctions, that in use do not appreciably self heat. In the '347 patent, a resistor is positioned close to a thermocouple junction to heat the junction. The submergence of the resistor and thermocouple junction within the liquid cryogen cools the resistor to decrease the magnitude of the signal generated by the thermocouple junction and thus supplies an indication of the level of the liquid cryogen.

As will be discussed, the present invention provides a point level detector that is less complicated than those of the prior art.

SUMMARY OF THE INVENTION

In accordance with the present invention, a point level detector is provided to sense the level of a liquid having a nonambient temperature, that is either above or below ambient temperature. The point level detector comprises an essentially non-self heated temperature sensing means for generating a temperature signal referable to absolute temperature. An elongated thermal conductor means is, at one end, in good thermal contact with the temperature sensing means and at the other end is exposed to the ambient so that heat is conducted between the temperature sensing means and the other of the ends of the thermal conductor means. Thermal insulator means are provided for insulating the thermal conductor means between the one and the other ends thereof so that the heat will not be dissipated along the length of the thermal conductor means. Additionally, the temperature signal will be constrained to follow a function given by a sum of cryogenic temperature of the cryogen and a constant divided by a convective heat transfer coefficient which increases in the liquid. As a result, the temperature signal will change upon submergence of the temperature sensing means within the liquid to indicate the level of the liquid. It is to be noted here that the present invention is described herein with respect to its potential use in sensing the level of a cryogenic liquid for exemplary purposes only. The present invention could be used in sensing the level of, for instance, boiling water.

BRIEF DESCRIPTION OF THE DRAWINGS

While the specification concludes with claims distinctly pointing out the subject matter that Applicant regards as his invention, it is believed that the invention will be better understood when taken in connection with the sole accompanying FIGURE which illustrates a point level detector in accordance with the present invention with portions broken away.

DETAILED DESCRIPTION OF THE INVENTION

With reference to the FIGURE, a point level detector 10 in accordance with the present invention is illustrated. Point level detector 10 utilizes a 0.508 mm. diameter stainless steel shielded type T thermocouple probe 12 which can be obtained from Omega Engineering, Inc. of Stamford, Conn. Thermocouple probe 12 has a proximal end 14 comprising a molded support for a pair of leads 16 and 18. Leads 16 and 18 can be connected to a device that utilizes or registers a temperature signal generated by a thermocouple contained within a distal end 20 of thermocouple probe 12.

Thermocouple probe 12 can not be used alone to sense the proximity of a cryogenic liquid because the temperature either below or directly above the surface of a liquid cryogen is approximately equal to the temperature of the liquid cryogen. The present invention however, does not use thermocouple probe 12 to sense the ambient temperature but rather, a sensor temperature that implies the convective heat transfer coefficient of its surroundings. This is accomplished by providing a thermal conductor 22. Thermal conductor 22 at opposite ends 24 and 26 is in good thermal contact with the thermocouple contained within distal end 20 of the thermocouple probe 12 and is exposed to the ambient, respectively. The good thermal contact between end 24 of thermal conductor 22 and distal end 20 of thermocouple probe 12 is preferably effectuated through the use of a bead 25 of a high thermal conductivity epoxy such as OMEGABOND 101 manufactured by Omega Engineering, Inc. of Stamford, Conn. Thermal conductor 22 conducts the heat to the thermocouple contained within distal end 20.

Thermal conductor 22 can be formed of 3.175 mm. copper tubing, approximately 15.24 cm. in length. Other heat conductive metals could be used in place of copper. Thermal conductor 22 is insulated along 12.70 cm. of its length by 6.35 mm. insulation 28 preferably formed by a tube of insulative material such as polytetrafluoroethylene. Approximately, 3.175 mm. of distal end 20 of thermocouple probe 12 is exposed. The small degree to which distal end 20 is exposed assures a minimum response time when the thermocouple junction transits from liquid to gas or vice-versa. This is because the heat capacity of the material in close proximity to the thermocouple junction determines the time of response. Insulator 28 insures that the heat being transferred to the thermocouple will not be dissipated along the length of thermal conductor 22. For instance, if the liquid rose to a level close to end 26 of conductor 22, short circuiting would occur in which heat was transferred to the cryogenic liquid rather the distal end 20 of thermocouple probe 12. Even if liquid did not rise to such a level, air currents and gas evolving from the liquid cryogen would also increase heat dissipation from thermal conductor 22 and would thus prevent heat from being consistently transferred from the ambient to distal end 20 of thermocouple probe 12.

Due to the heat transfer through thermal conductor 22 and the consistency of such heat transfer, the temperature of distal end 20 ($T_{tip}$) and therefore, the temperature signal generated within lines 16 and 18 will be given by the following relationship:

$$T_{tip} = T_{cryogen} + \frac{Q}{h_c A}$$

The sensed temperature will therefore equal a sum of the cryogen temperature given by $T_{cryogen}$ plus a constant equal to the essentially constant heat transferred to the distal end 20 (Q) divided by area and $h_c$ which equals the convective heat transfer coefficient. It is also evident from this equation that the smaller the surface area (A) of the probe, the greater will be the temperature response.

The convective heat transfer coefficient is greater in the cryogenic liquid than in the cryogenic vapor overlying the liquid. Hence, when distal end 20 of thermocouple probe 12 is submerged within the cryogen, a lower temperature will be sensed than hen distal end 20 of cryogenic probe 12 is clear of the liquid cryogen and is within the cryogenic vapor. As may be appreciated, the liquid level of for instance, boiling water could be sensed in the same manner. The sole difference would be that heat would be transferred from distal end 20 of thermocouple probe 12 to the ambient.

The point level detector 10 is used in a conventional manner to sense the level of a liquid cryogen within a container thereof. For instance, point level detector 10 can be mounted in a fixed relationship within a dewar. When the liquid falls below distal end 20 of thermocouple probe 26, the temperature signal produced in lines 16 and 18 can be used to trigger a control circuit to open a valve and allow additional cryogenic liquid to enter the dewar. Other uses and environments of use for level detector 10 would occur to those skilled in the art.

While a preferred embodiment of the present invention has been shown and described, it will be readily apparent to those skilled in the art that numerous changes and additions may be made without departing from the spirit and scope of the present invention.

I claim:

1. A point level detector to sense whether the level of a liquid having a temperature different than ambient temperature has reached a predetermined point, said detector comprising;

temperature sensing means, adapted to submerge within the liquid when the level of the liquid reaches the predetermined point and having a surface area, for generating a temperature signal referrable to absolute temperature without self-heating;

elongated thermal conductor means, at one end, in good thermal contact with the temperature sensing means and, at the other end, adapted to be exposed to the ambient so that heat is conducted between the temperature sensing means and the other of the ends of said thermal conductor means and when the temperature sensing means submerges within the liquid the temperature signal is a function of a sum of the temperature of the liquid and the heat conducted divided by a product of the surface area of the temperature sensing means and a convective heat transfer coefficient, which increases within the liquid; and thermal insulator means for insulating the thermal conductor means between the one and other ends thereof so that the heat will not be dissipated along the length of the thermal conductor means, whereby the temperature signal changes upon submergence of the temperature sensing means within the liquid to indicate that the level of the liquid has reached the predetermined point.

2. The point level detector of claim 1, wherein the temperature sensing means comprises:

a stainless steal shielded type T thermocouple probe having a proximal end and distal end;

a thermocouple contained within the distal end of the probe; and electrical conductors trailing from the proximal end of the probe, along which the temperature signal generated by the thermocouple is conducted.

3. The point level detector of claim 2, wherein the elongated thermal conductor means comprises a thermally conductive tube within which the thermocouple probe is received with its said distal end projecting therefrom.

4. The point level detector of claim 3, wherein the thermal insulator means comprises a tube fabricated from a thermal insulator and within which the thermally conductive tube is received.

5. The point level detector of claim 4, wherein:

the thermally conductive tube is fabricated from copper; and the thermal insulator comprises polytetrafluoroethylene.

* * * * *

UNITED STATES PATENT AND TRADEMARK OFFICE
CERTIFICATE OF CORRECTION

PATENT NO. : 5,167,154
DATED : December 1, 1992
INVENTOR(S) : Ron C. Lee

It is certified that error appears in the above—identified patent and that said Letters Patent is hereby corrected as shown below:

In the Abstract

Line 5, delete "A high thermal conductivity"
Line 9, insert "A high thermal conductivity" before "tube is"
Line 16, insert "a" after "will be"

Column 4, line 34 delete "steal" and substitute "steel" therefor.

Signed and Sealed this

Second Day of November, 1993

*Attest:*

BRUCE LEHMAN

*Attesting Officer*     Commissioner of Patents and Trademarks